United States Patent [19]

Sunda et al.

[11] Patent Number: 4,970,586
[45] Date of Patent: Nov. 13, 1990

[54] HALF-TONE IMAGE REPRODUCING METHOD OF IMPROVING GRADATION WITHOUT LOSS OF RESOLUTION

[75] Inventors: Fumihiro Sunda; Toshiyuki Yamaguchi, both of Nagoya, Japan

[73] Assignee: Brother Kogyo Kabushiki Kaisha, Aichi, Japan

[21] Appl. No.: 321,867

[22] Filed: Mar. 10, 1989

[30] Foreign Application Priority Data

Mar. 10, 1988 [JP] Japan .................................. 63-57225

[51] Int. Cl.$^5$ .............................................. H04N 1/46
[52] U.S. Cl. ....................................... 358/75; 358/80; 358/457
[58] Field of Search ....................... 358/75, 78, 79, 80, 358/457, 458; 355/35, 32, 27; 430/138

[56] References Cited

U.S. PATENT DOCUMENTS

| | | | |
|---|---|---|---|
| 4,663,662 | 5/1987 | Sekizawa | 358/75 |
| 4,710,822 | 12/1987 | Matsunawa | 358/457 |
| 4,730,185 | 3/1988 | Springer | 358/78 |
| 4,758,897 | 7/1988 | Hiratsuka | 358/457 |
| 4,809,063 | 2/1989 | Moriguchi et al. | 358/75 |
| 4,810,614 | 3/1989 | Sangyoji et al. | 430/138 |
| 4,864,326 | 9/1989 | Kawamura et al. | 358/75 |
| 4,875,073 | 10/1989 | Ueda et al. | 355/35 |
| 4,875,074 | 10/1989 | Sangyoji et al. | 355/32 |

FOREIGN PATENT DOCUMENTS 0106028 4/1989 Japan .................................... 355/35

*Primary Examiner*—Howard W. Britton
*Attorney, Agent, or Firm*—Oliff & Berridge

[57] ABSTRACT

Input data on a colored or monochromatic image having a gradation are recorded on a light transmissive sheet to prepare mask originals. The data on the colored image are separated into data corresponding to red, green and blue color components and the data on each of the color components are converted to dither data. At least two mask originals are prepared for each color on the basis of the dither data associated with the color. Photosensitive pressure-sensitive recording paper coated with microcapsules each encapsulating a chromogenic material is exposed to light through the mask originals and is then subjected to development under pressure, whereby the image is reproduced thereon. The mask originals carry at least two different patterns of image data for each color.

5 Claims, 3 Drawing Sheets

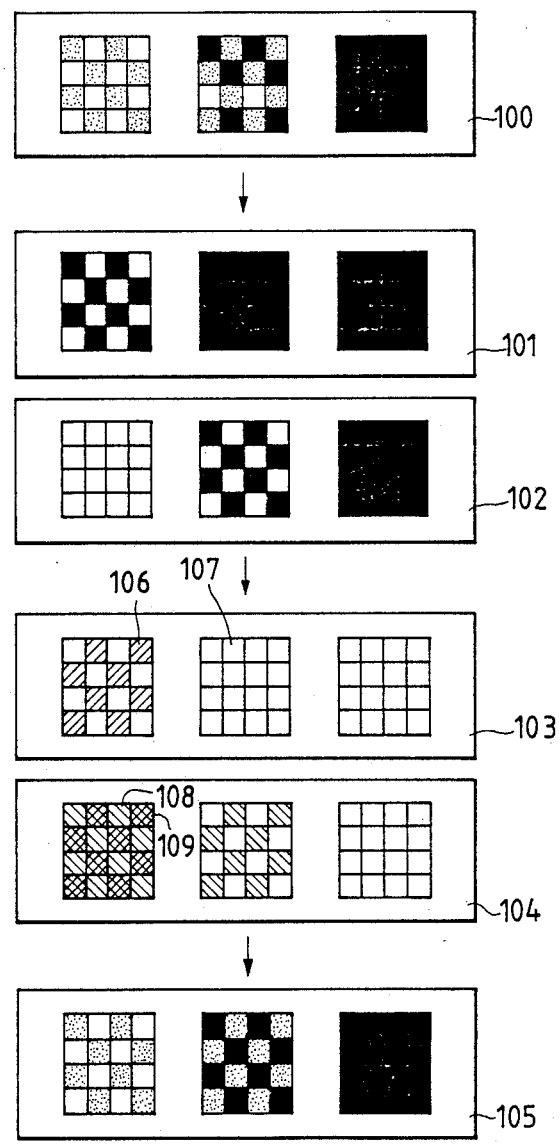

HALF-TONE IMAGE REPRODUCING METHOD OF IMPROVING GRADATION WITHOUT LOSS OF RESOLUTION

BACKGROUND OF THE INVENTION

This invention relates to a half-tone image reproducing method, and more particularly to such a method in which a half-tone image contained in a colored or monochromatic image is reproducible.

There are known various types of methods for forming an image, such as a thermal transfer type, a laser printing type. All of these methods are usually performed in the mode of a binary recording. In order to reproduce a half-tone image, it is necessary to employ a dither method. If the dither method is employed under the binary recording mode, each pixel has 10 gradations including white if it is composed of 3 dots ×3 dots, or 17 gradations also including white if it is composed of 4 dots ×4 dots. Neither the resolution or gradation can be improved without the sacrifice of the other.

There is also known a color image recording method using a photosensitive pressure-sensitive recording sheet as a recording medium. In forming an image thereon, mask originals are used, each carrying a light shielding image corresponding to each of three primary colors on a light transmissive base plate. In this method, the recording sheet is superposedly exposed to lights through the respective mask originals to superposedly form a latent image thereon and is then pressure developed to form a visible image on the same sheet or a separate sheet. According to this method, however, the mask originals are produced by a monochromatic binary output device, such as a thermal transfer printer or a laser printer, so that if the mask originals are produced by the dither method to reproduce half-tone images, the same problelm as that mentioned above is involved.

SUMMARY OF THE INVENTION

Under these circumstances, it is an object of this invention to provide a method of recording an image on a photosensitive recording medium in which an image can be reproduced with an improved gradation and a good color reproducibility at a low cost without the sacrifice of resolution and without requiring any image recording apparatus having a more complicated mechanism than is usually employed.

This and other objects are attained by a method of recording a color image on a photosensitive recording medium in accordance with image data representative of the color image, the image data containing at least one of red-color, green-color and blue-color components, the method comprising the steps of:

separating the image data into red, green and blue image data;

converting each of the red, green and blue image data to dither data to provide red-color, green-color and blue-color dither data, each of the dither data containing at least two types of data representing the associated color expressed in a first gradation expressed color being deeper in color density than the second gradation expressed color;

preparing at least two mask originals for each of red-color, green-color and blue-color components, the two mask originals being formed with light shielding patterns different from each other, the light shielding patterns being formed on the basis of the at least two types of data of the associated color; and exposing the photosensitive recording medium to lights through the mask originals to record the color image thereon.

Two kinds of the mask originals having different light shielding patterns are, for example, employed for the image data for each color, the image data for each color is converted to the first gradation color data which may be data having a dark color of deepest color density and to the second gradation color data which may be a light color of intermediate density, and two kinds of the mask originals are prepared on the basis of each kind of data. The photosensitive recording medium is exposed to light through the mask originals one after another to form an image of high resolution and gradation. Therefore, the method according to this invention can reproduce an image of high resolution and gradation, as well as of good color reproducibility and clarity, whether it may be a colored or monochromatic one.

BRIEF DESCRIPTION OF THE DRAWINGS

FIG. 4 is a view showing the relation between the results of exposure and pressure development as obtained by employing mask originals prepared in accordance with this invention;

DETAILED DESCRIPTION OF THE PREFERRED EMBODIMENTS

Figure 2:
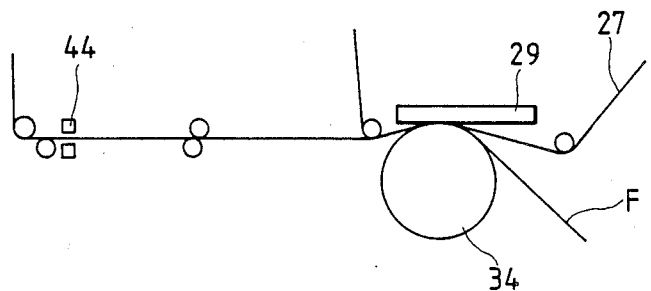
FIGS. 2 and 3 are views illustrating a mechanism for positioning a light transmissive base plate.
Figure 3:
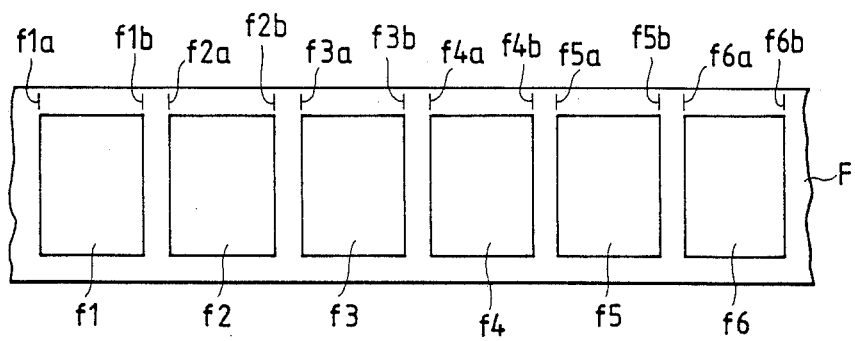

An image recording method according to this invention will now be described by way of example with reference to FIGS. 1 to 3. The following description will refer for the mere sake of simplicity to the case in which two mask originals are prepared for each of three color image data representing three primary colors of red, green and blue. A recording medium as used in the embodiment of this invention is a self-contained type photosensitive pressure-sensitive recording medium, such as the one as disclosed in U.S. Pat. No. 4,440,846. The self-contained recording medium is such that pressure rupturable microcapsules encapsulating therein a chromogenic material or dye precursor, and a developer material are co-deposited on one surface of a single substrate as one layer or as two contiguous layers. The microcapsules are normally photocured when exposed to light.

Figure 1:
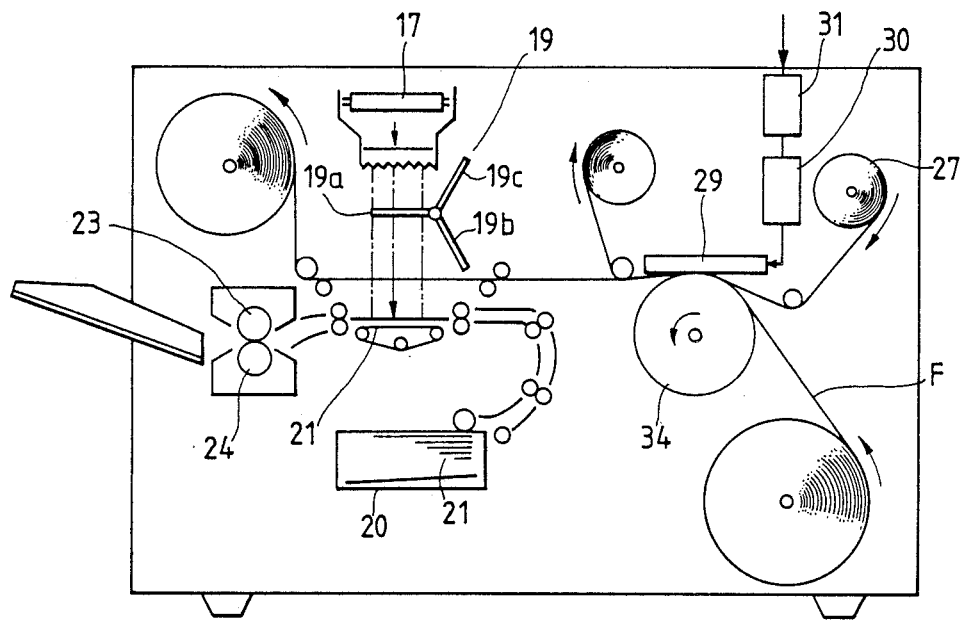
FIG. 1 is a schematic cross-sectional view of an image recording apparatus of a thermal transfer type which is employed for carrying out the process of this invention.

FIG. 1 shows by way of an example an image recording apparatus which can be employed for carrying out the method of this invention, according to which a half-tone color image can be reproduced while applying thereto a dither method.

The apparatus is fed by an input device (including a reader) with color image data taken from a colored original corresponding to the three primary colors of red, green and blue, or with image data prepared by a computer. Detailed description of the input device is omitted herein, since such is well known in the art.

When the image data have been received from the input device, the 'red' image data is first supplied to a data processing unit 31 and converted to dither data including deep red color data representative of the deepest red color in the density of red color and half-tone red data representative of a red color in an intermediate level color density. The data (1) covering both the deep red color data and the half-tone red data are first supplied to a thermal head 29 through a control unit 30 and the thermal head 29 is driven to record the data (1) on a light transmissive sheet F held between the thermal head 29 and a platen 34. The data is recorded thereon to provide a first mask original f1 (see FIG. 3). Then, the data (2) representative of only the deep red data is likewise recorded on the sheet F. The data (2) is recorded thereon to provide a second mask original f2.

The 'green' and 'blue' image data are sequentially supplied to the data processing unit 31 one after another and each of these data are likewise converted to two kinds of data. Data (3) of the 'green' image data covers both deep green color data and half-tone green data, and data (5) of the 'blue' image data covers both the deep blue color data and half-tone blue data. The data (4) covers only the deep green color data and data (6) convers only the deep blue color data. The data (3) to (6) are separately recorded on the recording paper F, thereby providing third to sixth mask originals, respectively. Thus, two kinds of image data representing each of the three colors, or a total of six kinds of image data (1) to (6) are monochromatically recorded on the paper F separately from one another, thereby providing six mask originals.

The first mask original f1 is first conveyed to the left as viewed in FIG. 1 and positioned immediately below a light source 17. A photosensitive pressure-sensitive recording paper 21 is taken out from a cassette 20 and is positioned on the lower surface of the mask original f1. A light emitted from the light source 17 is irradiated onto the paper 21 through a first portion 19a of a filter 19 transmitting only light having a peak wavelength of 350 nm sensitive to cyan microcapsule, and through the mask original f1. This irradiation is continued for a period of time long enough to totally photocure the cyan microcapsules.

Then, the sheet F is moved to the left by a distance which is equal to the pitch between two adjoining mask originals, whereby the second mask original f2 is positioned immediately above the paper 21. Light having a wavelength of 350 nm is irradiated onto the paper 21 through the filter portion 19a and the mask original f2. This exposure is, however, continued only for a period of time t1 (see FIG. 7). The time t1 is determined so that a half number of the exposed cyan microcapsules are photocured.

A second filter portion 19b transmitting only a light having a peak wavelength of 385 nm sensitive to magenta microcapsules is used in conjunction with the 'green' mask originals f3 and f4. A third filter portion 19c transmitting only light having peak wavelength of 475 nm sensitive to yellow microcapsules is used in conjunction with the 'blue' mask originals f5 and f6. Light exposures through the mask originals f3 and f5 are performed until the microcapsules are completely photocured, while light exposure through the mask originals f4 and f6 are performed for the duration of time t1, similar to the exposure taken place with respect to the 'red' color image data.

The fundamental color recording portions are light-shielded in both the mask originals f1 and f2, or f3 and f4, or f5 and f6, no yellow, magenta or cyan microcapsules are photocured. In the case of the half-tone color recording portions, however, it is exposed to light for the period of time t1 and the microcapsules are, therefore, partly photocured. After it has been exposed to light through the six mask originals f1 to f6, the paper 21 is moved forward and subjected to development under pressure by a pressure developing unit comprising developing roller 23 and a backup roller 24. In the pressure development, the uncured microcapsules are ruptured and the chromogenic materials released from the ruptured microcapsules react with a developer material, whereby a visible image is provided. In the fundamental color area, the complete development of color takes place, as the microcapsules have not been photocured at all, while in the light color area, no complete development occurs, but a light color appears, as the microcapsules have been partly photocured.

It is very important to position each of the six mask originals f1 to f6 on the sheet F accurately relative to the paper 21. Therefore, the starting lines f1a to f6a of the frames of the mask originals f1 to f6 and the ending lines f1b to f6b thereof are printed on the sheet F by the thermal head 29, as shown in FIG. 3. A photosensor 44 is provided for detecting the starting lines f1a to f6a progressively to position each of the mask originals f1 to f6 accurately relative to the paper 21, as shown in FIG. 2.

The sheet F is preferably a polyester film of high transparency having a thickness of about 50 microns, though it is also possible to use a PPC sheet having light transmitting property, etc. For preparing the masking frames, it is possible to use not only a binary recording system of, for example, the thermal or electrical conduction transfer type or a laser printer, but also a multi-digit recording device.

Figure 5:
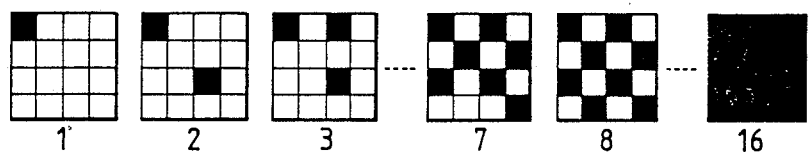
FIG. 5 is a view showing a set of dither matrices formed by a binary output data.
Figure 6:
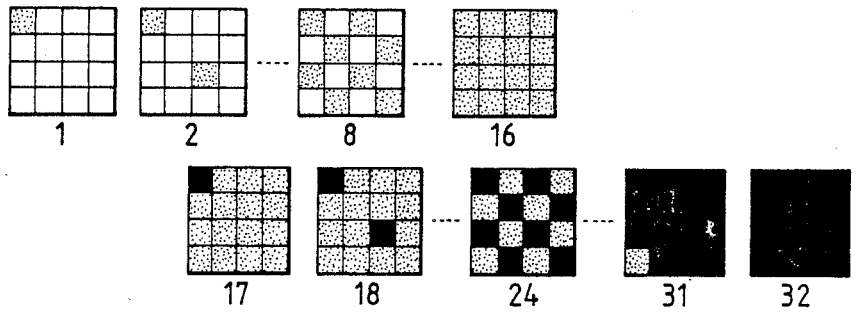
FIG. 6 is a view showing a set of dither matrices formed by both a binary output data and a half-tone output data.

Description will now be made with respect to the dither method for recording half-tone color images. FIG. 5 shows the matrices by way of a dither method according to a Bayer binary $4\times 4$ system. 16 ($4^2$) gradations, or 17 including white are achieved by the Bayer's dither method. It is, however, possible to achieve 32 ($2\times 4^2$) gradations if two levels of density, deepest and intermediate density or dark and light, are employed as shown by way of example in FIG. 6. It is possible to obtain 48 gradations if three levels of density are employed.

The following description is directed to the case in which two levels of density are employed. The 'red', 'green' and 'blue' image data extracted from the original are supplied from the input device to the data processing unit 31 (FIG. 1) and are converted to data 100 including two levels of density, as shown in FIG. 4. A mask original 101 covering data on both the dark and light colors and a mask original 102 covering data on only the dark color are prepared in accordance with the data 100 by an output device of the binary recording type.

Figure 7:
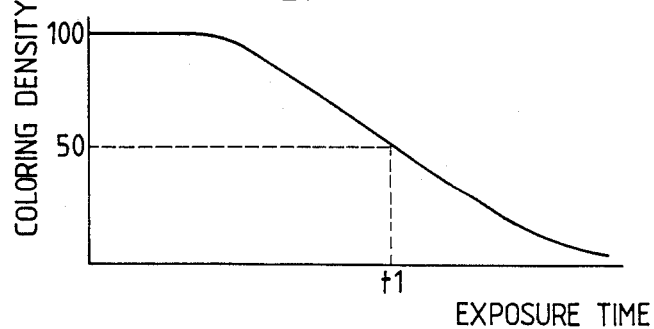
FIG. 7 is a graph showing the relation between a coloring density of a photosensitive pressure-sensitive recording paper and an exposure time.

The density of color developed on the photosensitive pressure-sensitive recording paper is so related to the exposure time as shown in FIG. 7. It is possible to develop a color of intermediate density if the exposure time is appropriately controlled. The photosensitive pressure-sensitive recording paper is exposed to light through the mask original 101 for at least the minimum period of time that is required for the full photocuring of those portions of the paper which are exposed to light twice through the two mask originals 101 and 102. The paper 103 which has been exposed to light contains a partly or completely cured microcapsules 106 and uncured microcapsules 107, as shown in FIG. 4. Then, the paper 103 is exposed to light through the mask original 102 for the period of time t1 which is employed for realizing a light color as hereinabove stated, whereby only the light color portion is partly photocured, while no dark color portion is photocured, as shown at 104.

When the paper 104 is subjected to development under pressure, the development of the uncured microcapsule 107 affords a dark color and the development of the partly cured microcapsule 108 affords a light color, while the development of the completely cured microcapsule 109 does not afford any color. Therefore, the data 100 including both the dark and light colors can be reproduced on the photosensitive pressure-sensitive recording paper 105.

The foregoing operation is equally applicable to the process employing dots having three or more levels of density, though no description thereof is given herein.

According to the method of this invention, it is possible to reproduce an image of controlled resolution and gradation by varying the size of the matrix and the number of levels of density. For example, it is possible to realize an image of high resolution without causing any change of gradation if an increased number of mask originals are employed for each color to increase the number of levels of its density.

What is claimed is:

1. A method of recording a color image on a photosensitive recording medium in accordance with image data representative of said color image, said image data containing at least one of red-color, green-color and blue-color components, said method comprising the steps of:

separating said image data into red, green and blue image data;

converting each of said red, green and blue image data to dither data to provide red-color, green-color and blue-color dither data, each of said color dither data containing at least two types of data representing an associated color expressed in at least two gradations;

a first gradation of each expressed color being deeper in color density than a second gradation of each expressed color;

preparing at least two mask originals for each red-color, green-color and blue-color component, said two mask originals being formed with light shielding patterns different from each other, said light shielding patterns being formed on the basis of said at least two types of data of the associated color; and exposing said photosensitive recording medium to light through each of said mask originals sequentially to record said color image thereon.

2. A method according to claim 1, wherein one of said two mask originals for each of red-color, green-color and blue-color components is formed with a first light shielding pattern in accordance with said two types of data and the other of said mask originals is formed with a second light shielding pattern in accordance with one of said two types of data corresponding to said first gradation.

3. A method according to claim 2, wherein said first and second light shielding patterns are formed using a dither method expressed according to a binary recording system.

4. A method according to claim 1, wherein said exposure through a mask original having said first light shielding pattern thereon is taken place for a first predetermined period of time and said exposure through a mask original having thereon said second light shielding pattern is taken place for a second predetermined period of time, wherein said first predetermined period of time is longer than said second predetermined period of time.

5. A method according to claim 4, wherein said first predetermined period of time is determined depending upon said first gradation and said second predetermined period of time is determined depending upon said second gradation.

* * * * *